United States Patent [19]

Hotta

[11] Patent Number: 4,689,787
[45] Date of Patent: Aug. 25, 1987

[54] METHOD OF INITIALLY ESTABLISHING BURST ACQUISITION IN TDMA SATELLITE COMMUNICATIONS SYSTEM AND ARRANGEMENT THEREFOR

[75] Inventor: Toshinori Hotta, Tokyo, Japan
[73] Assignee: NEC Corporation, Japan
[21] Appl. No.: 827,792
[22] Filed: Feb. 7, 1986
[30] Foreign Application Priority Data Feb. 8, 1985 [JP] Japan ................................. 60-23289

[51] Int. Cl.[4] ................................................. H04J 3/06
[52] U.S. Cl. ..................................... 370/104; 370/103
[58] Field of Search ..................... 370/104, 95, 103; 375/107, 3; 455/12

[56] References Cited

U.S. PATENT DOCUMENTS

| 3,566,267 | 2/1971 | Golding | 370/104 |
| 4,339,817 | 7/1982 | Hata et al. | 375/107 |
| 4,513,416 | 4/1985 | Fujiwara | 370/100 |
| 4,607,257 | 8/1986 | Noguchi | 375/107 |

Primary Examiner—Douglas W. Olms
Attorney, Agent, or Firm—Laff, Whitesel, Conte & Saret

[57] ABSTRACT

In order to initially establish burst acquisition in a TDMA satellite communications system, at least one of multiple earth stations (a first station) is controlled to instruct one of the other earth stations (a second station) to transmit an acquisition signal. The acquisition signal is transmitted in a continuous manner and has lower power than normal or full power. The first station receives the acquisition signal transmitted via a satellite transponder and detects a reference time point included in the received acquisition signal. Thereafter, the first station obtains a time difference between the reference time point and a received reference burst time point. The time difference intelligence is sent to the second station, which in turn transmits a burst at a time point determined by the transmitted time difference information.

3 Claims, 6 Drawing Figures

METHOD OF INITIALLY ESTABLISHING BURST ACQUISITION IN TDMA SATELLITE COMMUNICATIONS SYSTEM AND ARRANGEMENT THEREFOR

BACKGROUND OF THE INVENTION

1. Field of The Invention

This invention relates to a method of permitting an earth station(s) to initially access its assigned time slot in a TDMA (Time Division Multiple Access) system and also an arrangement therefor, and more specifically to such a method and arrangement featuring that only one or two of the earth stations are required to have an acquisition control arrangement in the overall TDMA system. This invention utilizes a low power burst acquisition signal for the initial access to the satellite.

2. Description of the Prior Art

In the TDMA system, multiple earth stations (viz., reference station and traffic terminals) share one satellite transponder on a time division basis. Each earth station transmits bursts in a manner that each burst is located within an allocated time slot of each consecutive TDMA frame. The burst therefore has the same period as the TDMA frame, and the times of the bursts are carefully controlled using a reference burst transmitted from the reference station so that no two bursts overlap.

FIG. 1 is a diagram showing a TDMA frame format, in which R denotes a reference burst, each of C, C' and C" denotes a burst which is transmitted from an earth station already in communication with the satellite, and D denotes a time slot preassigned to a given earth station but which is not being used.

When an earth station wants to initially access the satellite, the burst transmit timing is unknown to the earth station and hence burst acquisition support is necessary prior to burst synchronization control. To this end there have been proposed several techniques such as a prediction method, low power method using a low level acquisition signal, etc.

The prediction method, disclosed in Japanese patent application laid open under publication No. 42-6417, predicts an assigned time slot according to a computed saltellite orbit. This method, however, has encountered the problem that any error in the prediction might cause the station's burst to overlap other time slots and therefore interupt communications already in progress between other stations. On the other hand, the low power method found to be useful due to its high efficiency in band utilization as well as its simplicity. As a consequence, this invention utilizes a low power acquisition signal.

FIGS. 2(A) and 2(B) are diagrams describing known methods which utilize the low power signals, wherein FIG. 2(A) shows a continuous low power signal E and FIG. 2(B) a low power pulses F (only one is shown). In both figures, the TDMA frame is identical to that of FIG. 1.

The acquisition signal E (FIG. 2(A)) is produced by PSK (Phase Shift Keying) modulating a PN (Pseudo random Noise) sequence or a special digital sequence, and has a lower power than a normal level by approximately 20 dB, for example. The low amplitude acquisition signal E, sent out from the earth station intending to enter communication, is relayed back via a satellite to the same earth station and is demodulated therein. The demodulated acquisition signal E is compared with the sync signal to detect their relative phase difference, thereby allowing an accurate burst transmit timing to be obtained.

On the other hand, with the other low power method shown in FIG. 2(B), the earth station, desiring communication with the satellite, sends out the low power acquisition pulses F and receives same via the satellite. The accurate transmit timing is detected by scanning either automatically or manually the received pulses in order to locate the pulse in the time slot assigned to the earth station.

However, with these methods, all the earth stations (viz., traffic terminals) of the prior art (FIGS. 2(A) and 2(B)) are required to individually perform the initial accessing, and thus requires that each earth station has its own burst acquisition control arrangement. Therefore, these methods suffer from the drawback that each earth station is bulky, complicated in arrangement and expensive to manufacture. Further, these methods should overcome noise interference resulting from the use of the low level acquisition signals. One approach to solving this problem is to use narrow band filtering. Another is to improve a receiving error rate by employing a decision by majority method. These requirements further complicate and increase the cost of each station.

SUMMARY OF THE INVENTION

It is therefore an object of this invention to enable a plurality of earth stations to initially access satellite in a system wherein only one or two of the same are equipped with burst control acquisition control arrangements.

A first aspect of this invention takes the formed of a method of initially establishing burst acquisition in a TDMA satellite communications system using an acquisition signal wherein the TDMA satellite communications system includes one reference station and a plurality of traffic terminals, the acquisition signal having a period equal to a TDMA frame period or equal to a positive integer multiples of the TDMA frame and having first predetermined transmission power lower than second predetermined transmission power, the method comprising the steps of: controlling the reference station or one of the traffic terminals (a first earth station) to instruct one of the other traffic terminals (a second earth station) to transmit the acquisition signal; receiving, at the first earth station, the acquisition signal transmitted from the second earth station, detecting a first reference time point included in the received acquisition signal, and obtaining a time difference between the first reference time point and a second reference time point, the second reference time point being obtained by receiving a reference burst transmitted from the reference station; controlling the first earth station to inform the second earth station of information of the time difference; and establishing the burst acquisition of the second earth station by controlling the second earth station to transmit a burst having the second predetermined transmission power at a time point determined according to the information of the time difference.

A second aspect of this invention takes the form of a TDMA satellite communications system which includes one reference station and a plurality of traffic terminals, the plurality of traffic terminals being controlled to initially access a satellite using an acquisition signal, the acquisition signal having a period equal to a TDMA frame period or equal to a positive integer multiples of the TDMA frame and having first predetermined transmission power lower than second predetermined transmission power, the TDMA satellite communications system including an arrangement provided in the reference station or one of the traffic terminals (a first earth station), the first earth station instructing one of the other traffic terminals (a second earth station) to transmit the acquisition signal for initially establishing burst acquisition of the second earth station, the arrangement comprising: a first means for receiving the acquisition signal, the first means detecting a first reference time point of the acquistion signal; a second means for receiving a reference burst transmitted from the reference station, the first means producing a second reference time point using the reference burst; a third means coupled to the first means for receiving the first reference time point and being coupled to the second means for receiving the second reference time point, the third means obtaining a time difference between the first and second reference time points; a fourth means coupled to the third means for transmitting information of the time difference applied therefrom to the second earth station; and a fifth means coupled to the first, third and fourth means for controlling the operations thereof.

A third aspect of this invention takes the form of a TDMA satellite communications system which includes one reference station and a plurality of traffic terminals, the plurality of traffic terminals being controlled to initially access a satellite using an acquisition signal, the acquisition signal having a period equal to a TDMA frame period or equal to a positive integer multiples of the TDMA frame and having first predetermined transmission power lower than second predetermined transmission power, the TDMA satellite communications system being arragned such that the reference station or one of the traffic terminals (a first earth station) instructs one of the other traffic terminals (a second earth station) to transmit the acquisition signal for initially establishing burst acquisition of the second earth station, the second earth station comprising: a first means for receiving a reference burst transmitted from the reference station, the first means producing a reference time point using the reference burst; a second means for receiving instructions, transmitted from the first earth station, of sending out the acquistion signal from the second earth station; a third means coupled to the first means, the third means being arranged to control the transmission of the acquisition signal in synchronism with the reference time point wherein the acquisition signal assumes the first predetermined power; and a fourth means coupled to the second means for transmitting a burst from the second earth station to the first earth station at a time point determined by time difference information transmitted from the first earth station, the burst having the second predetermined power.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

Before describing a preferred embodiment of this invention, a principle underlying same will be discussed with reference to FIG. 3, wherein there are schematically illustrated the time points of the reference bursts, etc. which are transmitted from earth stations and then relayed back thereto via a satellite.

Figure 3:
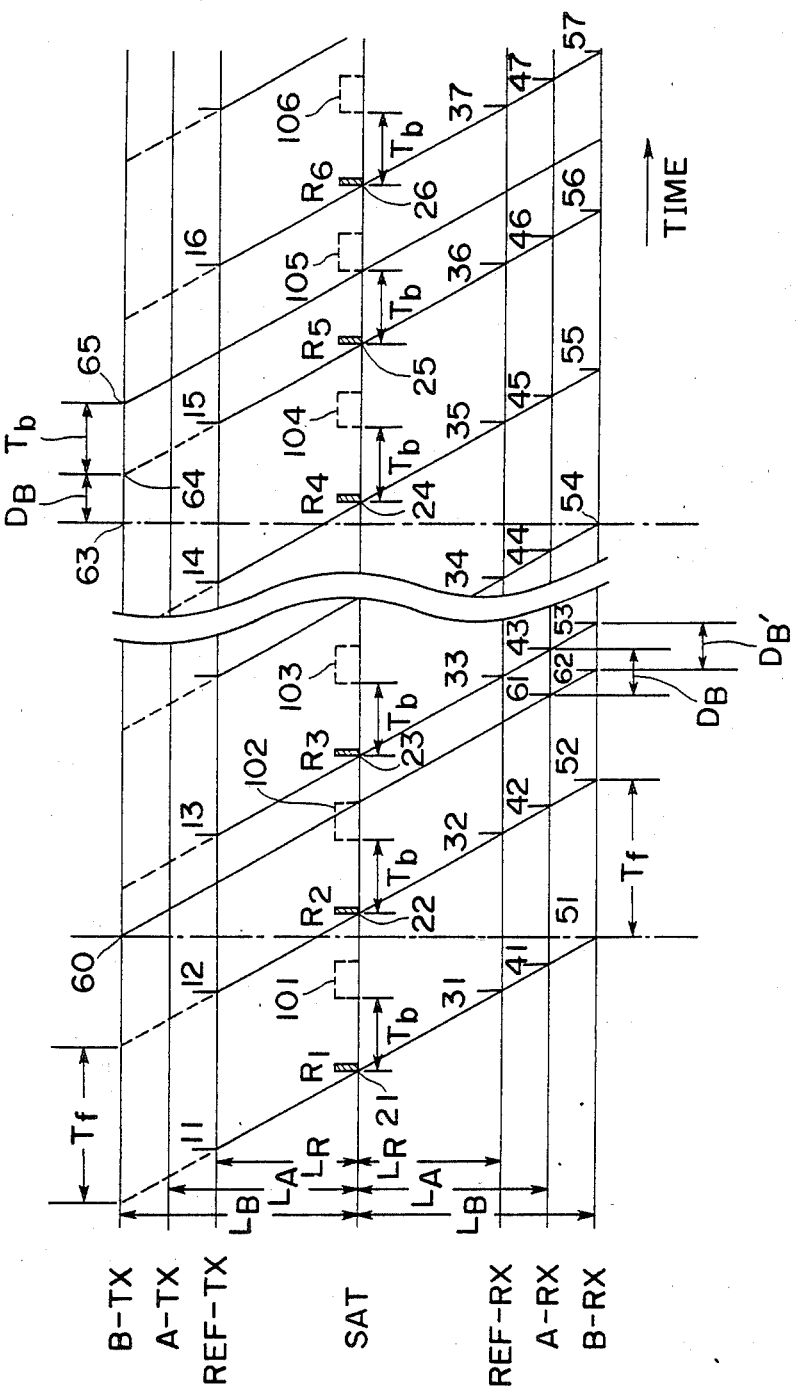
FIG. 3 is a diagram showing a principle underlaying this invention.

In FIG. 3 it is assumed that one of the earth stations other than the reference station is provided with the burst acquisition control arrangement according to this invention. Such an earth station (viz., one traffic terminal) will be referred to as an A station. On the other hand, the other earth stations (traffic terminals), which have not such a control arrangement, will be referred to as B stations. It should be noted that only one station B is illustrated in FIG. 3 for simplicity.

B-TX, A-TX and REF-TX in FIG. 3 represent the time axes on which the time points of the bursts sent out from the B, A and reference stations are respectively plotted, while SAT indicates the time axis on which the time points of the bursts passing through the satellite are plotted. On the other hand, REF-RX, A-RX and B-RX indicate the time axes on which the time points of the bursts relayed back via the satellite to the above-mentioned reference, A, and B stations are respectively shown. Further, $L_R$, $L_A$ and $L_B$ indicate the distances between the satellite and the reference, A, and B stations, while Tf represents one TDMA frame.

The reference bursts R1 through R6 are transmitted in this order from the reference station at time points 11 through 16, respectively. The start signal of the reference burst R1 passes through the satellite at a time point 21, and then reaches the reference, A, and B stations at time points 31, 41 and 51, respectively. In a similar manner, the start signals of the reference bursts R2, R3, R4, R5 and R6 pass through the satellite at time points 22, 23, 24, 25 and 26, and reach the reference station at time points 32, 33, 35, 36 and 37, and thereafter reach the A station at time points 42, 43, 45, 46 and 47, and finally reach the B station at time points 52, 53, 55, 56, and 57, respectively.

Each of boxes 101, 102, 103, 104, 105 and 106 indicates a time slot assigned to the B station which wants to enter into communication, i.e., initially access the satellite, while Tb is a time duration from the beginning of the time slot to the start signal of the reference signal (R1, R2, ...). Tb can be obtained from a predetermined burst time plan.

If the B station is allowed to send out the aquistion or access signal in a manner that a reference pulse thereof (its time point is denoted 60) coincides in time with the time point 51, then the reference pulse reaches the A and B stations at time points 61 and 62, respectively. It is clearly apparent that the time difference between the time points 61 and 43 (denoted $D_B$) is equal to that between the time points 62 and 53 (denoted $D_B'$). The time difference $D_B$ can be measured at the A station using the acquisition control arrangement provided therein. More specifically, the A station obtains $D_B$ by counting system clocks from the reception of the reference pulse (time point 61) to the reception of the start signal of the next arriving reference signal R3 (time point 43). On the contrary, the time difference $D_B'$ is not available at the B station in that the acquisition control arrangement is not installed therein. The A station, therefore, informs the B station of the time difference $D_B$ via the satellite. The B station delays the time point 54 (viz., 63) by the time duration $D_B$ advised by the A station, and then assumes the delayed time point, corresponding to a time point 64, as a reference time point for transmitting a normal level burst. Thereafter, the B station sends out the normal power burst at a time point 65 which is delayed from the time point 64 by Tb, resulting in that the start signal of the normal power burst passes through the satellite at the beginning of the assigned time slot 105 without failure.

Figure 4:
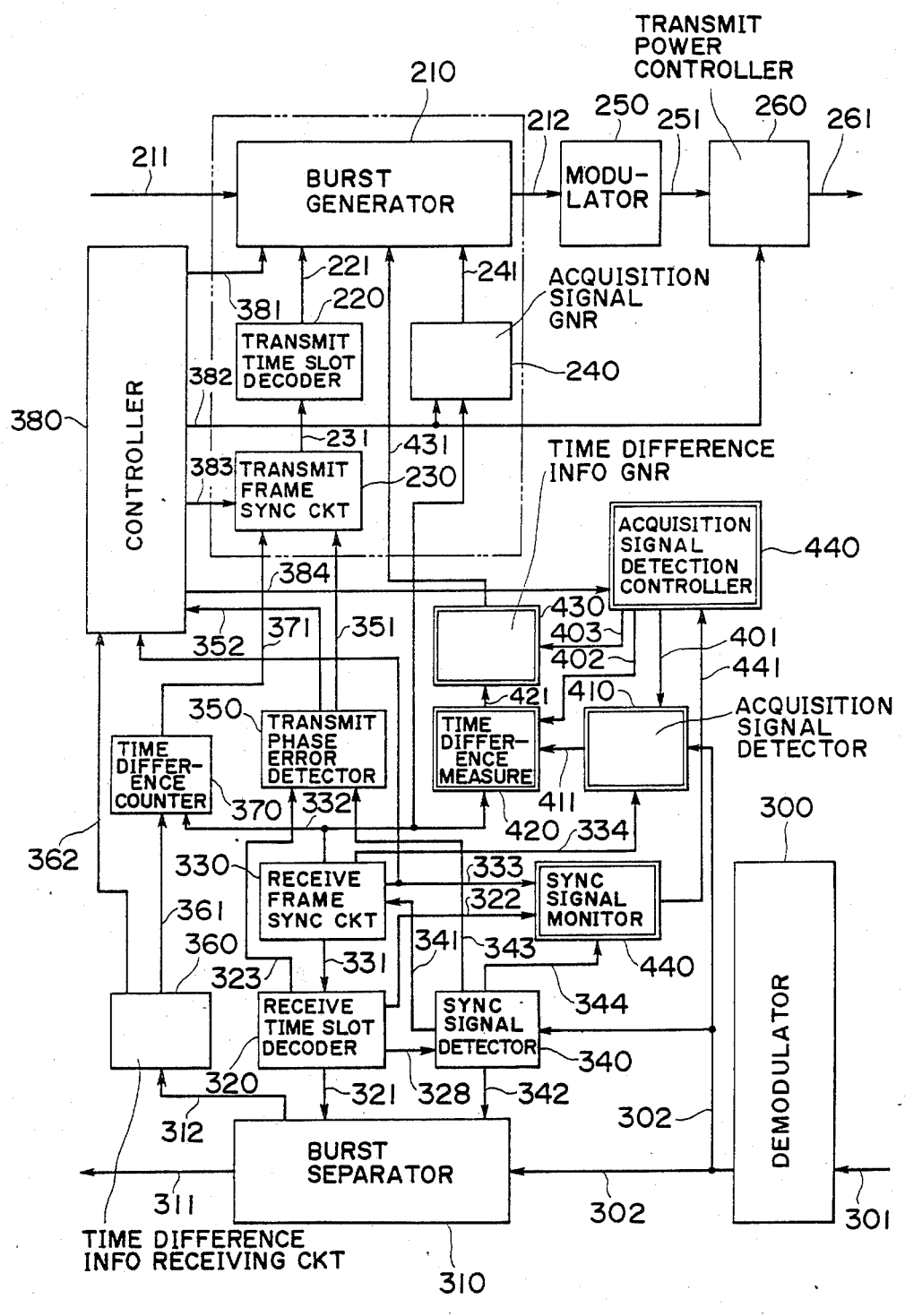
FIG. 4 is a block diagram showing one preferred embodiment according to this invention.

Referring now to FIG. 4, wherein the burst acquisition control arrangement according to this invention is shown in block diagram form together with the associated blocks.

In FIG. 4, double-line blocks comprises the burst acquisition control arrangement, and hence the A station includes all of the blocks shown in FIG. 4, while the B station or stations are devoid of the same.

The arrangement shown in FIG. 4 comprises a burst generator 210, a transmit time slot decoder 220, a transmit frame sync circuit 230, an acquisition signal generator 240, a modulator 250, a transmit power controller 260, a demodulator 300, a burst separator 310, a receive time slot decoder 320, a receive frame sync circuit 330, a sync signal detector 340, a transmit phase error detector 350, a time difference information receiving circuit 360, a time difference counter 370, a controller 380, a burst acquisition signal detection controller 400, a burst acquisition signal detector 410, a time difference measuring circuit 420, a time difference information generator 430, and a sync signal monitor 440, all of which are coupled as shown.

Before discussing in detail the initial burst acquisition control according to this invention, the arrangement shown in FIG. 4 will be described assuming that the initial burst acquisition has already been established.

A signal 211 to be transmitted is applied to the burst generator 210. The signal 211 is an analog signal such as a voice signal, by way of example. The burst generator 210 is adapted to pulse-code modulate the signal 211, and performs "time-division multiplexing", "sync signal addition" and "scrambling" with respect to the pulse-code modulated signal, as is well known in the art. The burst generator 210 applies a high speed digital signal (viz., burst) 212 to the modulator 250 which is usually a PSK (Phase Shift Keying) modulator. The PSK modulated signal 251 is applied, via the transmit power controller 260, to a transmit section (not shown), which converts the frequency of the applied signal (261) into a predetermined transmission frequency and sends out same via a suitable output amplifier to the satellite.

On the other hand, a signal relayed via the satellite is applied to a receive section (not shown) which includes a low noise amplifier and frequency converter. An IF (Intermediate Frequency) signal 301, outputted from the receive section, is applied to the demodulator 300 which demodulates the incoming IF signal into a corresponding high-speed digital signal 302 through a synchronous or coherent detection. The signal 302 is fed to the burst separator 310, which reproduces a signal 311 after "descrambling", "burst separation" and "decoding" of the applied signal.

The demodulted digital signal 302 is also applied to the sync signal detector 340, which extracts a sync signal (UW (Unique Word)) from the reference burst and applies an UW detection pulse 341 to the receive frame sync circuit 330. The UW detection pulse 341 is employed to synchronize a receive frame counter (not shown) within the circuit 330 in order to establish the receive frame synchronization. The receive frame counter applies a receive time slot signal 331 to the receive time slot decoder 320, which produces a gate pulse 321 using the applied signal 331. The gate pulse 321 is fed to the burst separator 310 and is used therein to control the above-mentioned various operations thereof.

The receive time slot decoder 320 generates a prediction signal 323 which predicts a receive timing of the signal emitted from itself. The receive phase error detector 350 is supplied with the receive timing prediction signal 323 and a sync pattern detection signal 343 from the detector 340, and compares the two applied signals to measure a transmission phase error. The detector 350 applies a correction signal 351 to the transmit frame sync circuit 230 which controls the start pulse's phase in response to the applied correction signal 351. The output 231 of the sync circuit 230 is decoded at the transmission time slot decoder 220 whose output 221 is fed to the burst generator 210.

The initial burst acquisition control according to this invention will be described with reference to FIGS. 4 through 5. As mentioned previously, it is assumed that the burst acquisition control arrangement is provided in only one of the traffic terminals (viz., the A station) and not provided in the reference station.

A discussion will first be made to the operation of the A station. More specifically, the A station receives the initial acquisition signal from the B station, and detects a relative time difference between the receive time points of the reference point of the acquisition signal and the reference burst, and thereafter advises the B station of the obtained time difference information.

Figure 1:
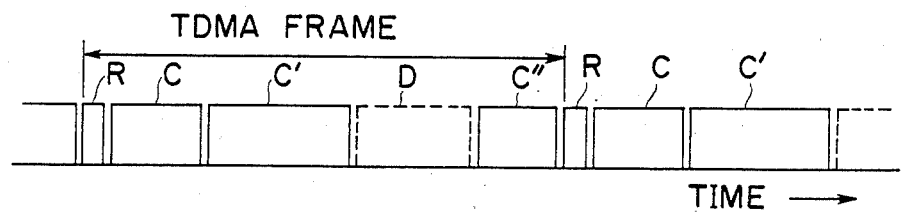
FIG. 1 is a diagram showing a TDMA frame format referred to in the opening paragraphs of this specification.
Figure 2A:
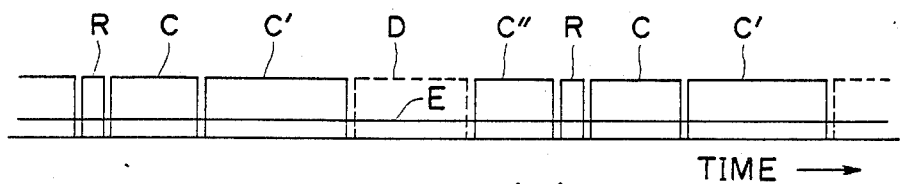
FIG. 2(A) is a diagram showing a continuous low power burst acquisition signal together with a TDMA frame format identical to that shown in FIG. 1, used in conjuction with an explanation of a prior art technique given in the opening paragraphs of this specification.
Figure 2B:
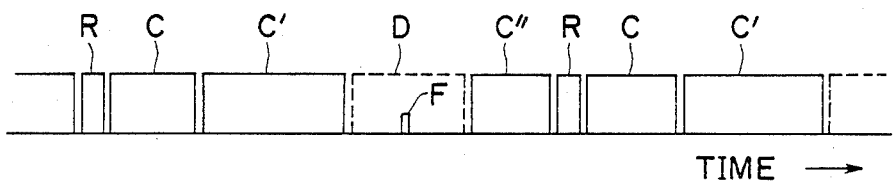
FIG. 2(B) is a diagram showing a low power burst acquisition signal together with a TDMA frame format idential to that shown in FIG. 1, used in conjunction with an explanation of another prior art given in the opening paragraphs of this specification.
Figure 5:
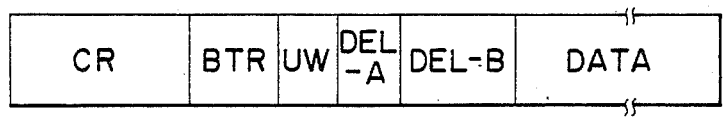
FIG. 5 is a diagram showing a burst acquisition control signal used in this invention.

The earth A station sends out a burst whose format is shown in FIG. 5. In this figure, CR, BTR, UW, DEL-A and DEL-B represent respectively a carrier recovery pattern, bit timing recovery pattern, time difference information index, and time difference information, while DATA indicates a data section although not used for the initial burst acquisition control. It should be noted that the DEL-B also includes information identifying the B station which intends to initially establish communication links in the TDMA system. The CR, BTR and UW are well known in the art and hence will not be described in detail for clarity.

The time difference information index DEL-A, which consists of two bits, indicates the content of the time difference information DEL-B:

00 . . . The content of DEL-B should be neglected;
01 . . . Instructing the B station, specified by the content of DEL-B, to send out the burst acquisition signal;
10 . . . Indicating that DEL-B is the time difference information;

11 ... Instructing the B station, specified by the content of DEL-B, to terminate the transmission of the burst acquisition signal.

Before the A station controls the initial burst acquisition of the B station, it is necessary that the A station itself has already established the communication link with the reference station. If the A station is in such a condition, viz., if the A station is ready to control the B station, the control circuit 380 applies a ready signal (or sync state indicating signal) 384 to the acquisition signal detect controller 400, while the receive frame sync circuit 330 sends out a receive sync indicating signal 333 to the sync signal monitor 440.

It is assumed that all of the B stations have not yet established respective burst acquisition. However, for ease of understanding, the station A starts to control a given station B'.

In this case, the acquisition signal detection controller 400 should first detect that the station B' has not yet established initial acquisition. The sync signal monitor 440 watches the output 344 of the sync signal detector 340 to determine, using the output 322 of the decoder 320, whether the detector 340 fails to detect the UW of the B' station in the time slot assigned thereto. More specifically, the output 322 contains the information of the B' station, viz., the location of the UW aperture as well as the station identification number. In the event that the sync signal detector 340 is unable to find the UW of the B' station, it informs the detection controller 400 of the station identification number via its output 441.

In order that the station A sends the burst acquisition control signal (FIG. 5) to the station B', the controller 400 applies its output 403 to the time difference information generator 430. The generator 430, in response to the output 403, supplies the burst generator 210 with its output 431 in order to set the code "01" to DEL-A and also allow DEL-B to include the station identification number of the station B'. It should be noted that both DEL-A and DEL-B form part of the burst acquisition control signal. At the same time, the controller 400 applies its output 401 to the acquisition signal detector 410 to instruct same to wait for the low power acquisition signal which will be sent from the station B' via the satellite transponder.

How the station B' sends out the low power acquisition signal in response to the above-mentioned burst acquisition control signal from the A station will be described.

The B' station modulates, at the modulator 300, the incoming IF signal applied thereto. The modulated signal 302 is applied to the sync signal detector 340 which detects the UW within the reference burst, and outputs the detection signal 341 to the receive frame sync circuit 330. Although not shown, the circuit 330 includes an aperture generator and receive frame counter. The aperture generator is arranged to produce an aperture of the TDMA frame period and this aperture corresponds to the time slot assigned to the reference burst's UW, while the receive frame counter counts up the system clocks to generate one TDMA frame. In the event that the detection pulse 341 falls in the time slot assigned to the UW of the reference burst, the counter of the sync circuit 330 is reset to zero. The receive frame counter has a so-called fly-wheel function and hence is able to produce a timing pulse(s) which corresponds to the time slot assigned to the UW of the reference burst. Viz., the timing pulse is generated even if the UW of the reference burst fails to be detected.

This timing pulse, which corresponds to the time slot preassigned to the UW of the reference burst, is applied to the acquisition signal generator 240 and is used to set a predetermined N-bit pattern to a PN generator provided in the acquisition signal generator 240, wherein N corresponds to the number of shift registers of the PN generator. The output of the PN generator is then applied to the burst generator 210 as an output 241. The acquisition signal is a special pattern which is differentially phase modulated by the above-mentioned PN sequence having a period equal to the TDMA frame.

When the receive frame sync is establised in the B' station, the burst separator 310 knows the burst position of the A station according to the burst time plan, and supplies the time difference information receiving section 360 with the contents of DEL-A and DEL-B applied from the A station. The receiving section 360 performs error correcting decoding, parity check, etc. with respect to the DEL-A and DEL-B, and applies same to the controller 380 and counter 370 as signals 362 and 361, respectively. It should be noted that in this case the content of DEL-A is "01". If the controller 380 detects "01", then it applies its output 381 to relay the signal 241 from the acquisition signal generator 240 to the modulator 250 by way of the burst generator 210. Further, the controller 380 applies its output 382 to the transmit power controller 260 in order to control the transmit power to a predetermined low level. Thus, the low power acquisition signal of the TDMA frame period is transmitted to the A station.

Turning to the operation at the A station. The acquisition signal detector 410 differentially demodulates the signal 302 located in the UW aperture of the acquisition signal which was transmitted from the B station, and extracts a N-bit pattern from the differentially demodulated signal, wherein N corresponds to the number of shift registers arranged for generating the aforesaid PN sequence. The N-bit pattern is loaded to a PN generator using the UW aperture and then the PN generator is operated by the system clocks, whereby a PN sequence of one TDMA frame period is reproduced. The PN generator is provided in the acquisition signal detector 410 and is a type identical to that which is utilized to produce the acquisition signal. Thereafter, the recovered PN pattern is compared with a predetermined fixed pattern which is identical to the pattern set at the B station. In the event that the recovered PN pattern coincides with the predetermined fixed pattern, then the timing point thereof is deemed the reference point of the acquisition signal, and is outputted to the time difference measuring circuit 420 as a signal 411.

The measuring circuit 420 is responsive to the acquisition signal's detected pulse 411 and starts to count up the system clocks until the receive frame sync circuit 330 outputs its output 332, and applies a signal 421, indicating the time difference ($D_B$ in FIG. 3), to the time difference information generator 430.

The generator 430 changes the content of DEL-A to "10" in response to the signal 421, and also sets the time difference information to DEL-B, and applies its output 431 to the burst generator 210. Thus, the A station sends out the burst indicative of the time difference intelligence to the B' station.

Turning to the operation at the B station. When the time difference counter 370 receives the time difference information ($D_B$), it counts up the system clocks during a time duration corresponding to $D_B$ in response to the receive frame pulse 332 applied thereto, and outputs a delay pulse 371 retarded by $D_B$. On the other hand, the controller 380 responds to the reception of the code "10" and applies its output 383 to the transmit frame sync circuit 230 in order to permit the delay pulse 371 to reset a transmit frame counter which forms part of the circuit 230. Thereafter, the controller 380 instructs the burst generator 210 as well as the transmit power controller 260 to send out a normal or full power burst to the B' station, wherein the burst corresponds to the burst which includes only the portions CR, BTR and UW (FIG. 5).

In the event that the above-mentioned burst passes through the satellite during the time slot assigned to the B' station, then the A station is able to detect the UW of the B' station. Consequently, the A station terminates the transmission of the time difference information. On the other hand, the B' station is capable of detecting its own UM within the assigned time slot, and hence transfers to its normal operation.

If the A station is unable to confirm the acquisition signal or the UW to be transmitted from the B' station for a predetermined time peiriod, the A station sets the DEL-A to "11" to instruct the controller 380 of the B' station to terminate the transmission of the above signals.

It has been assumed in the foregoing that the A station controls only one earth station (viz., the station B') for the purposes of simplicity. However, it goes without saying that the acquisition signal controller 400 is able to control multiple earth stations by selecting one by one using an operation similar to the above discussion.

If the above-mentioned acquisition control apparatus is installed in the reference station, all of the earth stations in the TDMA system can be controlled by a single earth station.

Further, in the above discussion, the B' station transmits the low power acquisition signal at a time point identical to that of the received reference burst. However, should the acquisition signal transmit timing be specified or determined relative to the received reference burst, then the transmission timing is not necessarily restricted to such a time point.

What is claimed is:

1. A method of initially establishing burst acquisition in a TDMA satellite communications system using an acquisition signal wherein said TDMA satellite communications system includes one reference station and a plurality of traffic terminals, said acquisition signal having a period equal to a TDMA frame period or equal to a positive integer multiple of said TDMA frame and having a first predetermined transmission power which is lower than a second predetermined transmission power, said method comprising the steps of:

controlling a first earth station defined by said reference station or one of said traffic terminals to instruct a second earth station defined by one of the other traffic terminals to transmit said acquisition signal; p1 receiving, at said first earth station, the acquisition signal transmitted from said second earth station, detecting a first reference time point included in the received acquisition signal, and obtaining a time difference between said first reference time point and a second reference time point, said second reference time point being obtained by receiving a reference burst transmitted from said reference station;

controlling said first earth station to inform said second earth station of information of said time difference; and establishing the burst acquisition of said second earth station by controlling said second earth station to transmit a burst having said second predetermined transmission power at a time point determined according to said information of said time difference.

2. A TDMA satellite communications system which includes one reference station and a plurality of traffic terminals, said plurality of traffic terminals being controlled to initially access a satellite using an acquisition signal, said acquisition signal having a period equal to a TDMA frame period or equal to a positive integer multiple of said TDMA frame and having a first predetermined transmission power which is lower than a second predetermined transmission power, said TDMA satellite communications system including an arrangement provided in a first earth station defined by said reference station or one of said traffic terminals, said first earth station instructing a second earth station defined by one of the other traffic terminals to transmit said acquisition signal for initially establishing burst acquisition of said second earth station, said arrangement comprising:
a first means (410) for receiving said acquisition signal, said first means detecting a first reference time point of said acquisition signal;
a second means (330) for receiving a reference burst transmitted from said reference, said first means producing a second reference time point using said reference burst;
a third means (420) coupled to said first means for receiving said first reference time point and being coupled to said second means for receiving said second reference time point, said third means obtaining a time difference between said first and second reference time points;
a fourth means (430) coupled to said third means for transmitting information of said time difference applied therefrom to said second earth station; and
a fifth means (400) coupled to said first, third and fourth means for controlling the operations thereof.

3. A TDMA satellite communications system which includes one reference station and a plurality of traffic terminals, said plurality of traffic terminals being controlled to initially access a satellite using an acquisition signal, said acquisition signal having a period equal to a TDMA frame period or equal to a positive integer multiple of said TDMA frame and having a first predetermined transmission power which is lower than a second predetermined transmission power, said TDMA satellite communications system being arranged such that a first earth station defined by said reference station or one of said traffic terminals instructs a second earth station defined by one of the other traffic terminals to transmit said acquisition signal for initially establishing bust acquisition of said second earth station, said second earth station comprising:
a first means (330) for receiving a reference burst transmitted from said reference station, said first means producing a reference time point using said reference burst;

a second means (360) for receiving instructions, transmitted from said first earth station, of sending out said acquisition signal from said second earth station;

a third means (240, 380) coupled to said first means, said third means being arranged to control the transmission of said acquisition signal in synchronism with said reference time point wherein said acquisition signal assumes said first predetermined power; and a fourth means (230, 380) coupled to said second means for transmitting a burst from said second earth station to said first earth station at a time point determined by time difference information transmitted from said first earth station, said burst having said second predetermined power.

* * * * *